United States Patent
Ren et al.

(10) Patent No.: US 10,867,065 B2
(45) Date of Patent: Dec. 15, 2020

(54) SECURE VOICE COMMUNICATION METHOD AND DEVICE BASED ON INSTANT COMMUNICATION

(71) Applicant: Alibaba Group Holding Limited, George Town (KY)

(72) Inventors: Qing Ren, Hangzhou (CN); Hang Chen, Hangzhou (CN)

(73) Assignee: Alibaba Group Holding Limited

(*) Notice: Subject to any disclaimer, the term of this patent is extended or adjusted under 35 U.S.C. 154(b) by 220 days.

(21) Appl. No.: 15/760,172

(22) PCT Filed: Sep. 13, 2016

(86) PCT No.: PCT/CN2016/098818
§ 371 (c)(1),
(2) Date: Mar. 14, 2018

(87) PCT Pub. No.: WO2017/050150
PCT Pub. Date: Mar. 30, 2017

(65) Prior Publication Data
US 2018/0253565 A1     Sep. 6, 2018

(30) Foreign Application Priority Data
Sep. 22, 2015  (CN) .......................... 2015 1 0608978

(51) Int. Cl.
*H04L 29/00*        (2006.01)
*G06F 21/62*        (2013.01)
(Continued)

(52) U.S. Cl.
CPC ........ *G06F 21/6245* (2013.01); *G06F 21/604* (2013.01); *H04L 51/04* (2013.01);
(Continued)

(58) Field of Classification Search
CPC ... G06F 21/604; G06F 21/6245; H04L 63/20; H04L 51/04; H04L 63/10; H04L 63/04;
(Continued)

(56) References Cited

U.S. PATENT DOCUMENTS 3,849,603 A * 11/1974 Proios ................... H04M 9/001
                                                         379/173
4,411,017 A    10/1983 Talbot
(Continued)

FOREIGN PATENT DOCUMENTS

CN         102045712         5/2011
CN         102955904         3/2013
(Continued)

*Primary Examiner* — Don G Zhao
(74) *Attorney, Agent, or Firm* — Van Pelt, Yi & James LLP

(57) ABSTRACT

The present application provides an instant messaging-based secure voice communication method and means. The method comprises: receiving a user-issued secure communication instruction to conduct voice communications with at least one opposite terminal in a secure communication mode; establishing a voice communication connection with at least one opposite terminal according to the secure communication instruction; prohibiting, during voice communications with at least one opposite terminal, the occurrence of risky operations detrimental to the security of the voice communications. By providing a secure communication mode, the present application solves the security problems of voice communications in instant messaging contexts and improves the security of instant messaging.

26 Claims, 2 Drawing Sheets

(51) Int. Cl.
*H04L 29/06* (2006.01)
*H04L 12/58* (2006.01)
*H04M 1/725* (2006.01)
*H04W 4/12* (2009.01)
*G06F 21/60* (2013.01)

(52) U.S. Cl.
CPC .............. *H04L 63/04* (2013.01); *H04L 63/10* (2013.01); *H04L 63/20* (2013.01); *H04M 1/7255* (2013.01); *H04M 1/72552* (2013.01); *H04M 1/72577* (2013.01); *H04W 4/12* (2013.01); *H04L 51/046* (2013.01)

(58) Field of Classification Search
CPC ............ H04L 51/046; H04M 1/72577; H04M 1/7255; H04M 1/72552; H04W 4/12
See application file for complete search history.

(56) References Cited

U.S. PATENT DOCUMENTS

| | | | |
|---|---|---|---|
| 6,571,212 B1 | 5/2003 | Dent | |
| 7,076,657 B2 | 7/2006 | Koukoulidis | |
| 7,852,831 B2 | 12/2010 | Akbar | |
| 8,677,250 B2* | 3/2014 | Wormald | A63F 13/12 463/40 |
| 8,863,270 B2* | 10/2014 | Masiyowski | H04L 63/105 713/151 |
| 9,078,127 B2 | 7/2015 | Kritt | |
| 9,591,479 B1 | 3/2017 | Leavy | |
| 2002/0078153 A1 | 6/2002 | Chung | |
| 2004/0142709 A1* | 7/2004 | Coskun | G06Q 30/0209 455/466 |
| 2004/0168055 A1* | 8/2004 | Lord | H04L 63/0823 713/156 |
| 2006/0156063 A1* | 7/2006 | Mazzarella | G06Q 10/10 714/12 |
| 2006/0189278 A1* | 8/2006 | Scott | H04M 1/72588 455/90.3 |
| 2007/0003065 A1 | 1/2007 | Schwartz | |
| 2007/0003066 A1 | 1/2007 | Schwartz | |
| 2007/0022163 A1* | 1/2007 | Wormald | H04L 51/04 709/206 |
| 2007/0106568 A1* | 5/2007 | Asher | G06Q 30/02 705/26.81 |
| 2007/0143408 A1* | 6/2007 | Daigle | H04L 51/04 709/206 |
| 2007/0263783 A1* | 11/2007 | Speranza | H04L 12/66 379/67.1 |
| 2008/0311935 A1* | 12/2008 | Tysowski | H04L 51/04 455/466 |
| 2009/0215476 A1* | 8/2009 | Tysowski | H04L 51/04 455/466 |
| 2009/0282115 A1* | 11/2009 | Hung | G06Q 10/107 709/206 |
| 2010/0024036 A1* | 1/2010 | Morozov | G06F 21/53 726/26 |
| 2010/0185668 A1* | 7/2010 | Murphy | H04L 67/02 707/771 |
| 2012/0020297 A1* | 1/2012 | Cecchini | H04W 4/00 370/328 |
| 2012/0165049 A1* | 6/2012 | Arnold | H04M 1/72552 455/466 |
| 2012/0179829 A1* | 7/2012 | George | H04L 61/2564 709/227 |
| 2012/0197967 A1* | 8/2012 | Sivavakeesar | G06Q 10/10 709/203 |
| 2012/0209926 A1* | 8/2012 | Backholm | G06Q 50/01 709/206 |
| 2012/0296984 A1* | 11/2012 | Khan | H04L 51/20 709/206 |
| 2012/0311329 A1* | 12/2012 | Medina | H04L 51/04 713/168 |
| 2013/0268357 A1* | 10/2013 | Heath | H04L 63/00 705/14.53 |
| 2013/0347084 A1 | 12/2013 | Malinowski | |
| 2015/0350251 A1* | 12/2015 | Brander | H04L 63/20 713/168 |
| 2015/0350895 A1* | 12/2015 | Brander | H04L 51/04 455/411 |
| 2015/0373183 A1* | 12/2015 | Woolsey | G10L 15/22 348/14.08 |
| 2016/0062971 A1* | 3/2016 | Thakker | G06F 21/32 715/780 |
| 2016/0125155 A1* | 5/2016 | Shelter | H04N 7/155 705/2 |

FOREIGN PATENT DOCUMENTS

| | | |
|---|---|---|
| CN | 103152705 A | 6/2013 |
| CN | 104038614 | 9/2014 |
| CN | 104333662 A | 2/2015 |
| CN | 105323243 | 2/2016 |

* cited by examiner

SECURE VOICE COMMUNICATION METHOD AND DEVICE BASED ON INSTANT COMMUNICATION

CROSS REFERENCE TO OTHER APPLICATIONS

This application claims priority to International (PCT) Application No. PCT/CN2016/98818 entitled SECURE VOICE COMMUNICATION METHOD AND DEVICE BASED ON INSTANT COMMUNICATION filed Sep. 13, 2016 which is incorporated herein by reference for all purposes, which claims priority to People's Republic of China Patent Application No. 201510608978.0 entitled INSTANT MESSAGING-BASED SECURE VOICE COMMUNICATION METHOD AND MEANS filed Sep. 22, 2015 which is incorporated herein by reference for all purposes.

FIELD OF THE INVENTION

The present application relates to a field of communication technology. In particular, it relates to an instant messaging-based secure voice communication method and means.

BACKGROUND OF THE INVENTION

As the Internet and communication technology develops, instant messaging has gradually arisen and become the most popular form of communication. Instant messaging increases the convenience and immediacy of interpersonal communications. However, it also creates information security problems. For example, users may take a screenshot at any time while instant messaging and send the communication content to another good friend, with the result that the information is leaked.

To solve the security information problem created by instant messaging, the prior art has developed schemes such as the "public bath house" mode and the "burn after reading" mode. These are used to solve the security problems associated with text information in instant messaging contexts. However, there still is no good solution to the security problems associated with voice communications in instant messaging contexts.

SUMMARY OF THE INVENTION

Multiple aspects of the present application provide an instant messaging-based secure voice communication method and means, which are for solving the security problems of voice communications in instant messaging contexts and improving the security of instant messaging.

One aspect of the present application provides an instant messaging-based secure voice communication method, which comprises: receiving a user-issued secure communication instruction to conduct voice communications with at least one opposite terminal in a secure communication mode.

establishing a voice communication connection with said at least one opposite terminal according to said secure communication instruction;

prohibiting, during voice communications with said at least one opposite terminal, the occurrence of risky operations detrimental to the security of said voice communications.

In an optional implementation of the present application, said receiving a user-issued secure communication instruction to conduct voice communications with at least one opposite terminal in a secure communication mode comprises:

receiving a start instruction issued by said user to initiate a secure communication mode;

presenting said user with a secure communication interface based on said start instruction;

receiving said secure communication instruction issued by said user via said secure communication interface.

In an optional implementation of the present application, said prohibiting, during voice communications with said at least one opposite terminal, the occurrence of risky operations detrimental to the security of said voice communications comprises at least one of the implementations below:

prohibiting the implementation of app-level functions for implementing said risky operations in the process of implementing said secure communication mode;

screening, during voice communications with said at least one opposite terminal, app-level functions for implementing said risky operations;

prohibiting, during voice communications with said at least one opposite terminal, the calling of system-level functions for implementing said risky operations;

In an optional implementation of the present application, said prohibiting, during voice communications with said at least one opposite terminal, the occurrence of risky operations detrimental to the security of said voice communications comprises:

prohibiting, during voice communications with said at least one opposite terminal, the occurrence of risky operations detrimental to the security of said voice communications and matching the security level of said voice communications.

In an optional implementation of the present application, prior to said prohibiting, during voice communications with said at least one opposite terminal, the occurrence of risky operations detrimental to the security of said voice communications and matching the security level of said voice communications, it comprises:

receiving a security level instruction issued by said user;

determining the security level of said voice communications according to said security level instruction.

In an optional implementation of the present application, said risky operations comprise at least one of the following:

audio recording operations, speaker operations, peripheral device operations, communication record saving operations, operations to display the identity information of said user and said at least one opposite terminal, and screenshot operations.

Another aspect of the present application provides an instant messaging-based secure voice communication means, which comprises: an instruction-receiving module, for receiving a user-issued secure communication instruction to conduct voice communications with at least one opposite terminal in a secure communication mode;

a connection-establishing module, for establishing a voice communication connection with said at least one opposite terminal according to said secure communication instruction;

a security-handling module, for prohibiting, during voice communications with said at least one opposite terminal, the occurrence of risky operations detrimental to the security of said voice communications.

In an optional implementation of the present application, said instruction-receiving module is specifically for:

receiving a start instruction issued by said user to initiate a secure communication mode;

presenting said user with a secure communication interface based on said start instruction;

receiving said secure communication instruction issued by said user via said secure communication interface.

In an optional implementation of the present application, said security-handling module is specifically for executing at least one of the operations below:

prohibiting the implementation of app-level functions for implementing said risky operations in the process of implementing said secure communication mode;

screening, during voice communications with said at least one opposite terminal, app-level functions for implementing said risky operations;

prohibiting, during voice communications with said at least one opposite terminal, the calling of system-level functions for implementing said risky operations;

In an optional implementation of the present application, said security-handling module is specifically for:

prohibiting, during voice communications with said at least one opposite terminal, the occurrence of risky operations detrimental to the security of said voice communications and matching the security level of said voice communications.

In an optional implementation of the present application, said instruction-receiving module is further for:

receiving a security level instruction issued by said user;

determining the security level of said voice communications according to said security level instruction.

In an optional implementation of the present application, said risky operations comprise at least one of the following:

audio recording operations, speaker operations, peripheral device operations, communication record saving operations, operations to display the identity information of said user and said at least one opposite terminal, and screenshot operations.

In the present application, a user is permitted to conduct voice communications in a secure communication mode with at least one opposite terminal. Thus, when the user needs to conduct voice communications in a secure communication mode with at least one opposite terminal, he or she may issue a secure communication instruction. A voice communication connection is established with at least one opposite terminal in accordance with the user-issued secure communication instruction to conduct voice communications with at least one opposite terminal in a secure communication mode. Moreover, during the voice communications with at least one opposite terminal, the occurrence of risky operations detrimental to the security of the voice communications is prohibited. Thus, the security problem of voice communications in instant messaging contexts is solved, and the security of instant messaging is improved.

BRIEF DESCRIPTION OF THE DRAWINGS

Various embodiments of the invention are disclosed in the following detailed description and the accompanying drawings.

In order to provide a clearer explanation of the technical schemes in embodiments of the present application, a simple introduction is given below to the drawings which are needed to describe the embodiments or the prior art. Obviously, the drawings described below are embodiments in the present application. Persons with ordinary skill in the art could, without expending creative effort, obtain other drawings on the basis of these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Specific Embodiments

In order to shed more light on the objectives, technical schemes, and advantages of the embodiments of the present application, the technical schemes in the embodiments of the present application are described clearly and completely in light of the drawings of the embodiments of the present application. Obviously, the embodiments described are some of the embodiments of the present application and are not all the embodiments. So long as no additional creative effort is expended, all other embodiments that are obtained by persons with ordinary skill in the art on the basis of embodiments in the present application fall within the scope of protection of the present application.

Figure 1:
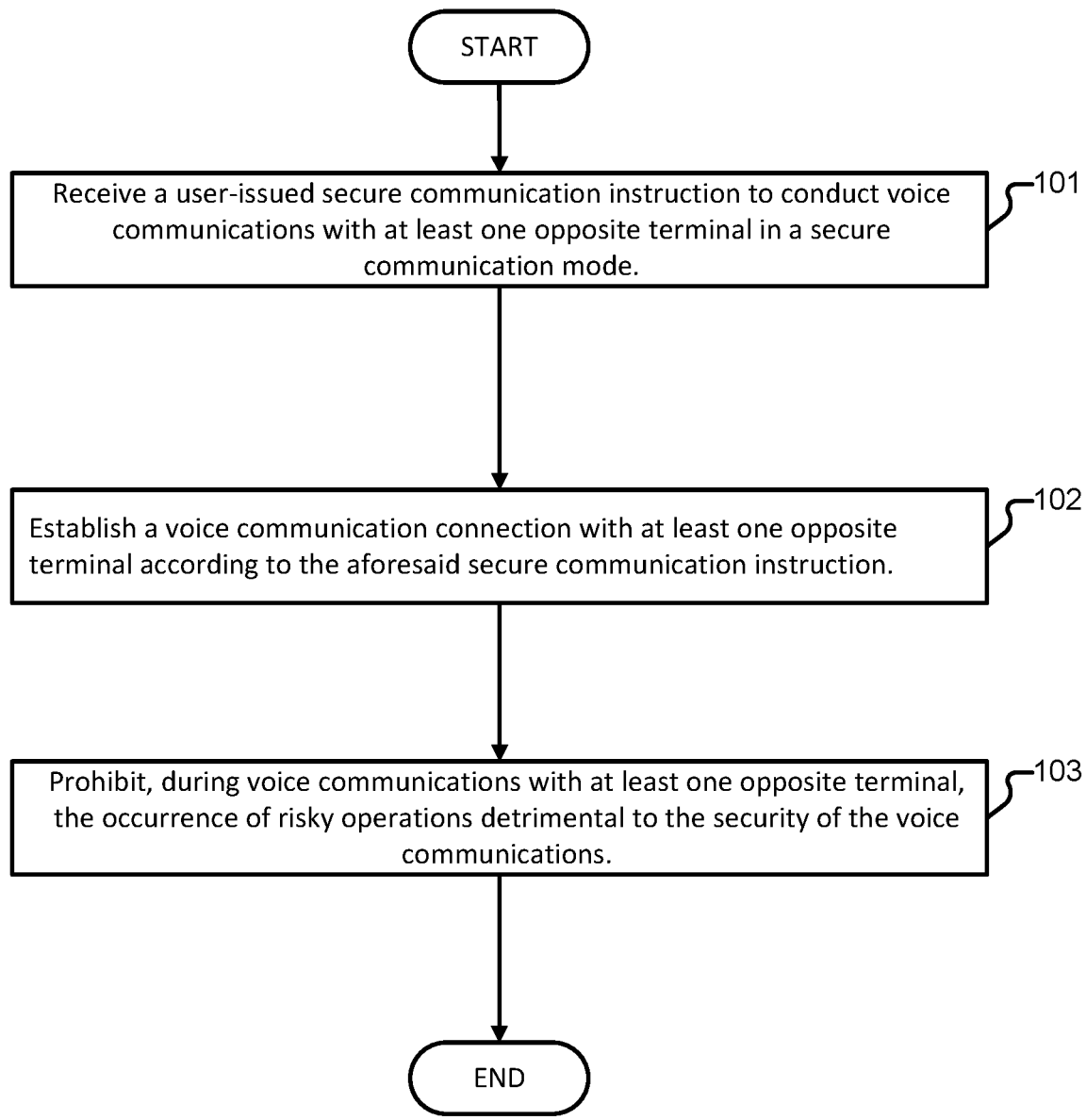
FIG. 1 is a flowchart of an instant messaging-based secure voice communication method provided an embodiment of the present application.

FIG. 1 is a flowchart of an instant messaging-based secure voice communication method provided an embodiment of the present application. As shown in FIG. 1, the method comprises:

101: Receive a user-issued secure communication instruction to conduct voice communications with at least one opposite terminal in a secure communication mode.

102: Establish a voice communication connection with at least one opposite terminal according to the aforesaid secure communication instruction.

103: Prohibit, during voice communications with at least one opposite terminal, the occurrence of risky operations detrimental to the security of the voice communications.

The present embodiment provides an instant messaging-based secure voice communication method which can be implemented by an instant messaging-based secure voice communication means (abbreviated as "secure voice communication means"). Its main purposes are to solve the security problem of voice communications in instant messaging contexts, meet the confidentiality needs of private user phone calls, and improve the security of instant messaging. The method of the present embodiment may be used in various types of instant messaging apps such as DingTalk, WangWang, Laiwang, QQ, and WeChat. The "voice communications" mentioned in the present embodiment refer generally to all communication contexts comprising voice in instant messaging contexts. Examples include video chats, voice chats, toll-free telephone calls, real-time communication, teleconferences, videoconferences, and app-provided voice reminders.

In the present embodiment, a secure voice communication means provides a secure communication mode to users. It permits a user to conduct voice communications with at least one opposite terminal in a secure communication mode. The secure communication mode in the present embodiment is a communication mode that ensures the security of voice communications by prohibiting risky operations detrimental to voice communications. Please note that the name of the secure communication mode may vary according to the instant messaging app. To take DingTalk as an example, the secure communication mode that it provides is called "bathhouse mode," but the names are not limited to this one. To give an example, secure communication modes provided by the present embodiment may also be called private chat mode, secure mode, confidential mode, and so on.

Specifically, when a user's voice communications with at least one opposite terminal need to be confidential, he or she may issue a secure communication instruction to conduct voice communications with at least one opposite terminal in a secure communication mode. As for the secure voice communication means, it receives a user-issued secure communication instruction to conduct voice communications with at least one opposite terminal in a secure communication mode.

Optionally, the secure voice communication means may set up a secure communication interface for a secure communication mode and complete a voice call conducted in the secure communication mode on the secure communication interface. When a user needs to conduct voice communications with at least one opposite terminal in a secure communication mode, he or she may issue a start instruction to initiate the secure communication mode. For example, the user may issue the start instruction via a secure communication entrance provided by the secure voice communication means. Said secure communication entrance could be a menu option, an icon, a button, or something else. As for the secure voice communication means, it receives the user-issued start instruction to initiate the secure communication mode and presents the user with a secure communication interface based on the start instruction. The user issues the secure communication instruction via the secure communication interface. Optionally, on the secure communication interface a control, such as an icon or a button, is set up so that the user can issue a secure communication instruction. By clicking on this control, the user issues the secure communication instruction. Or there is a preset gesture corresponding to the secure communication instruction. The user can perform a gesture on the secure communication interface to command that voice communications be conducted in a secure communication mode and in this way issue the secure communication instruction.

To take DingTalk as an example, the user's voice communications with at least one opposite terminal could be a user-launched communication process of user-conducted voice interactions with at least one opposite terminal. Or it could be a voice reminder process (abbreviated as a "Ding call") carried out by the user for at least one opposite terminal using the voice reminder function provided by DingTalk. When the user needs to have voice interactions with at least one opposite terminal, he or she can find at least one opposite terminal user in the call directory and click on this at least one opposite terminal user to enter the instant messaging interface with the at least one opposite terminal user. The navigation bar on the instant messaging interface displays an icon directed at the safe communication interface (or for entering the safe communication mode). In DingTalk, the icon is specifically an "eyeglasses" icon, but is not limited to this. By clicking on the "eyeglasses" icon, the user can issue a start instruction to initiate the secure communication mode. The secure voice communication means presents the user with a secure communication interface based on the start instruction. This secure communication interface is a bathhouse mode communication interface. The user issues a secure communication instruction through a control set up on the bathhouse mode communication interface, or the user issues a secure communication instruction by performing a preset gesture.

When carrying out a voice reminder for at least one opposite terminal user using the voice reminder function provided by DingTalk, the user can find at least one opposite terminal user in the call directory and click on this at least one opposite terminal user to enter the personal information page for the at least one opposite terminal user. There is a "Ding" icon or button set up on this personal information page. By clicking on a Ding icon or button, the user can issue a start instruction to initiate the secure communication mode. The secure voice communication means presents the user with the secure communication interface based on the start instruction. This secure communication interface is in fact a Ding interface. An ordinary Ding reminder button and a secure Ding reminder button can be set up on this Ding interface so that the user can select between an ordinary Ding call and a secure Ding call. After entering the voice reminder information, the user clicks the secure Ding button to issue a secure communication instruction. The secure voice communication means sends the voice reminder to at least one opposite terminal in secure communication mode.

After receiving the secure communication instruction issued by the user, the secure voice communication means uses the secure communication instruction as the basis for establishing a voice communication connection with at least one opposite terminal. The secure communication instruction carries an identifier for the at least one opposite terminal. Said identifier for the at least one opposite terminal could be an account number, a mobile phone number, an IP address, or any other information that can uniquely identify the opposite terminal. Said at least one opposite terminal may be just one in number, which is suitable for an end-to-end secure call scenario. Said at least one opposite terminal may be multiple, which is suitable for a scenario in which several persons conduct a secure call, as in a group chat, a teleconference, a videoconference, or other such scenario. The secure voice communication means may employ the Transmission Control Protocol (TCP) and the User Datagram Protocol (UDP) in establishing voice communication connections with at least one opposite terminal. Or the secure voice communication means can establish a voice communication connection with at least one opposite terminal via a network socket.

After establishing a voice communication connection, the user can conduct voice communications with at least one opposite terminal. In existing instant messaging apps, some operations may have a deleterious effect on the security of voice communications. For example, audio recording operations, speaker operations, peripheral device operations, communication record saving operations, operations to display the identity information of the user and at least one opposite terminal, and screenshot operations may lead to leaks of information relating to voice communications and thus put the security of voice communications at risk.

For example, instant messaging as it currently exists generally always supports recording of the voice communication process. This audio recording content is either stored locally on the terminal or is uploaded to a server. In these processes, the audio recording content may very easily be acquired by a law-breaker or a third party. For example, a law-breaker could use a Trojan horse to steal local audio recording content from a terminal or acquire audio recording content by intercepting the upload process and thereupon leak this voice communication content, resulting in inestimable losses for the user. Therefore, in order to ensure that voice communications are secure, audio recording operations may be prohibited in the voice communication process.

For example, instant messaging as it currently exists generally always supports a speaker function, such as a speaker or hands-free function. With the use of the speaker function, one can even more clearly hear the voice of at least one opposite terminal, but the communication content may be heard by another user and be leaked as a result. The users will thus suffer inestimable losses or loss of privacy. Therefore, in order to ensure that voice communications are secure, speaker operations may be prohibited in the voice communication process. For example, users may be prohibited from using a speaker or hands-free function. In a specific implementation of a product, the button for the speaker or hands-free function could be grayed out and made inoperable for the user, thus prohibiting the user from use of the speaker or hands-free function.

For example, instant messaging as it currently exists generally always supports headsets or Bluetooth headphones. Moreover, some users like to use a headset or Bluetooth headphones during the voice communication process. This way, they can eliminate external interference and more clearly hear the voice of the other party. However, if a user connects the headset, Bluetooth headphones, or other peripheral device to another device, e.g., connects to a recording device to conduct audio recording during the voice communication process, this too will result in voice communication content leaks. Therefore, in order to ensure that voice communications are secure, peripheral device operations may be prohibited in the voice communication process. For example, use of the peripheral device function could be prohibited. When the user connects externally to a headset or Bluetooth headphones, the user could be alerted to the fact that this function is not available.

For example, instant messaging as it currently exists generally always has a function for automatically saving call logs. The saved call logs either are stored locally on the terminal or are uploaded to a server. In these processes, a call log may very easily be acquired by a law-breaker or a third party. For example, a law-breaker could use a Trojan horse to steal local call logs from a terminal or acquire local call logs by intercepting the upload process and thus leak this voice communication content, resulting in inestimable losses for the user. Therefore, in order to ensure that voice communications are secure, call log saving operations may be prohibited in the voice communication process.

For example, instant messaging as it currently exists generally always supports screenshot operations. During the voice communication process, a user may transmit or input other content in the instant messaging communication interface with at least one opposite terminal. By taking a screenshot, a user may easily send chat information to other users, resulting in leaks of relevant information in the voice communication process. Therefore, in order to ensure that voice communications are secure, screenshot operations may be prohibited in the voice communication process.

The present embodiment calls operations detrimental to voice communication security "risky operations." "Risky operations" primarily refer to various operations that can or might cause leakage of voice communications. Said risky operations detrimental to voice communication security may include at least one of the following: audio recording operations, speaker operations, peripheral device operations, communication record saving operations, operations to display the identity information of the user and at least one opposite terminal, and screenshot operations.

In the present embodiment, to reduce the security perils caused by risky operations to voice communications, voice communications are conducted with at least one opposite terminal in a secure communication mode. During voice communications with at least one opposite terminal, the secure voice communication device prohibits the occurrence of risky operations detrimental to the security of these voice communications and thus ensures the security of voice communications.

The ways in which these risky operations are prohibited in voice communications with at least one opposite terminal will vary according to differences in the ways in which risky operations detrimental to voice communication security are implemented.

Optionally, ways in which the occurrence of risky operations are prohibited in voice communications with at least one opposite terminal comprise at least one of the following:

One mode of implementation is: prohibiting the implementation of app-level functions for implementing the aforesaid risky operations detrimental to voice communication security in the process of implementing the secure communication mode. This mode of implementation primarily addresses those risky operations implemented by the functions that the secure voice communication means itself implements. The secure voice communication means itself is capable of implementing some functions. These functions are implemented by the secure voice communication means itself and are thus called app-level functions. If these app-level functions can generate risky operations detrimental to voice communication security, then implementation of the app-level functions used to implement these risky functions can be prohibited when the secure communication mode is implemented. To give an example, let us suppose that the secure voice communication means itself implements an audio recording function, but that the audio recording operation generated by this audio recording function is detrimental to the security of voice communications. Therefore, implementation of the audio recording function is prohibited when the secure communication mode is implemented. That is, the secure voice communication means does not have a voice recording function while in secure communication mode and is thus unable to generate an audio recording operation for voice communications.

Another mode of implementation is: screening, during voice communications with at least one opposite terminal, the implementation of app-level functions for implementing the aforesaid risky operations detrimental to voice communication security. This mode of implementation primarily addresses those risky operations implemented by the functions that the secure voice communication means itself implements. In an actual application, the secure voice communication means itself is capable of implementing some functions. These functions are implemented by the secure voice communication means itself and are thus called app-level functions. If the operations generated by some of these functions are detrimental to voice communications, then it is possible, while the user is engaged in voice communications with at least one opposite terminal, to screen the app-level functions for implementing these risky operations. For example, let us suppose that the secure voice communication means itself implements a screenshot function, a call log saving function, etc. However, the screenshot operation or call log saving operation implemented by the screenshot function or call log saving function may have an adverse effect on the security of voice communications. Therefore, these functions may be screened out in the voice communication process. In this mode of implementation, the secure voice communication means can implement these functions and thus facilitate their use by other communication modes. In the secure communication mode, however, the screening out of these functions can ensure the security of voice communications.

Another mode of implementation is: prohibiting, while the user is engaging in voice communications with at least one opposite terminal, the calling of system-level functions for implementing the aforesaid risky operations detrimental to voice communication security. This mode of implementation primarily addresses the need to call those risky operations implemented by system-provided functions. Some functions are provided by the operating system. To complete the appropriate operations, the voice communication means needs to call the corresponding operating system-provided functions. These operating system-provided functions are called system-level functions. If the operations implemented by system-level functions are detrimental to voice communication security, the secure voice communication means in secure communication mode can prohibit the calling of the system functions that implement these risky operations. For example, let us suppose that that the audio recording function is provided by the operating system, but that the audio recording operation generated by this audio recording function is detrimental to the security of voice communications. Therefore, the calling of this audio recording function can be prohibited in secure communication mode. Thus, there will be no audio recording operations directed at voice communications so as to ensure the security of voice communications.

In an optional mode of implementation, a secure voice communication means can, in addition to providing the user with a secure communication mode, also set the level of secure communication for the user, permitting the user to select the security level for voice communications. For example, the secure communication means may preset the security levels, e.g., security levels 1 through 3, in which case the user can select his or her voice communication security level to be one of levels 1 through 3. Different security levels correspond to different risky operations. A higher security level corresponds to a greater number of risky operations that will need to be prohibited in the voice communication process. For example, the risky operations corresponding to security level 1 include: audio recording operations and speaker operations. The risky operations corresponding to security level 2 include: audio recording operations, speaker operations, peripheral device operations, and call log saving operations. The risky operations corresponding to security level 3 include: audio recording operations, speaker operations, peripheral device operations, call log saving operations, operations to display the identity information of the user and at least one opposite terminal, and screenshot operations. Please note that the security levels here are not limited to 3 levels. Likewise, the risky operations corresponding to each security level are merely exemplary and are not limited thereto.

Based on the above, the secure voice communication means can also receive a security level instruction issued by the user. This security level instruction indicates the security level selected by the user for his or her voice communications. The secure voice communications means determines the security level of the voice communications according to the user's security level instruction. Accordingly, the secure voice communication means prohibits, while the user is engaged in voice communications with at least one opposite terminal, the occurrence of risky operations that are detrimental to the security of the voice communications and that match the security level of the voice communications. In this mode of implementation, the user is permitted to select a security level, which increases operational flexibility. For example, if the user's voice communication security is higher, he or she selects a higher security level to ensure voice communication security. If the user's voice communications require that a certain amount of security be ensured, but does not have especially high security requirements, a lower security level may be selected in that case. While ensuring security needs, the user may choose to use some functions, such as call log saving operations and operations for displaying identity information of the user and at least one opposite terminal. This helps to increase the flexibility of instant messaging. Clearly, in the present embodiment, prohibiting the occurrence of risky operations detrimental to the security of the voice communication while the secure voice communication means is engaged in voice communications with at least one opposite terminal solves the voice communication security problem in instant messaging contexts and improves security of instant messaging.

Please note that all the method embodiments described above have been presented as a series of a combination of actions in order to simplify description. However, persons skilled in the art should know that the present application is not limited by the action sequences that are described, for some of the steps may make use of another sequence or be implemented simultaneously in accordance with the present application. Furthermore, persons skilled in the art should also know that the embodiments described in the specification are preferred embodiments and that the actions and modules involved therein are not necessarily required by the present application.

In the embodiments described above, the description of each embodiment has its respective emphasis, and parts of an embodiment are not described detail. One may refer to other embodiments for the relevant descriptions.

Figure 2:
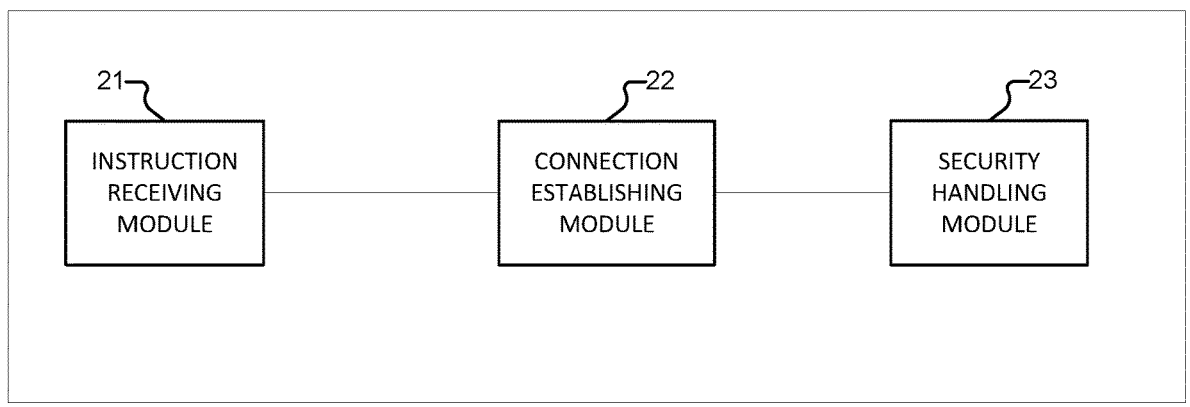
FIG. 2 is a structural diagram of an instant messaging-based secure voice communication means provided an embodiment of the present application.

FIG. 2 is a structural diagram of an instant messaging-based secure voice communication means provided an embodiment of the present application. As shown in FIG. 2, the means comprises: an instruction-receiving module 21, a connection-establishing module 22, and a security handling module 23.

The instruction-receiving module 21 is for receiving a user-issued secure communication instruction to conduct voice communications with at least one opposite terminal in a secure communication mode.

The connection-establishing module 22 is for establishing a voice communication connection with at least one opposite terminal according to the secure communication instruction received by the instruction-receiving module 21.

The security-handling module 23 is for prohibiting, during voice communications with at least one opposite terminal, the occurrence of risky operations detrimental to the security of the voice communications.

In an optional implementation, the instruction-receiving module 21 is specifically for: receiving a start instruction issued by the user to initiate a secure communication mode;

presenting the user with a secure communication interface based on the start instruction;

receiving the secure communication instruction issued by the user via the secure communication interface.

In an optional implementation, the security-handling module 23 is specifically for executing at least one of the following operations: prohibiting the implementation of app-level functions for implementing risky operations in the process of implementing said secure communication mode; screening, during voice communications with said at least one opposite terminal, app-level functions for implementing risky operations; prohibiting, during voice communications with said at least one opposite terminal, the calling of system-level functions for implementing risky operations.

In an optional implementation, the security-handling module 23 is specifically for:

prohibiting, during voice communications with at least one opposite terminal, the occurrence of risky operations detrimental to the security of the voice communications and matching the security level of the voice communications.

Based on the above, the instruction-receiving module 21 is further for: receiving a security level instruction issued by the user;

determining the security level of voice communications according to the security level instruction.

In an optional implementation, the aforesaid risky operations comprise at least one of the following:

audio recording operations, speaker operations, peripheral device operations, communication record saving operations, operations to display the identity information of the user and at least one opposite terminal, and screenshot operations.

The instant messaging-based secure voice communication means provided by an embodiment of the present application may be implemented as any of various instant messaging app clients, but is not limited thereto.

The instant messaging-based secure voice communication means provided by an embodiment of the present application permits the user to conduct voice communications with at least one opposite terminal in a secure communication mode. A voice communication connection can be established with at least one opposite terminal in accordance with the user-issued secure communication instruction to conduct voice communications with at least one opposite terminal in a secure communication mode. Moreover, during the voice communications with at least one opposite terminal, the occurrence of risky operations detrimental to the security of the voice communications is prohibited. Thus, the security problem of voice communications in instant messaging contexts is solved, and the security of instant messaging is improved.

Persons skilled in the art may clearly understand that, for the sake of descriptive convenience and streamlining, one may refer to the processes in the aforesaid method embodiments that correspond to specific work processes of the systems, means, and units described above. They will not be discussed further here.

Please understand that, in several embodiments provided by the present application, the disclosed systems, means, and methods may be implemented in other ways. For example, the means embodiments described above are merely illustrative. For example, the division into said units is merely a division by logical function. When actually implemented, there may be other forms of division. For example, multiple units or components may be combined or integrated into another system, or some features might be omitted or not executed. In addition, the interposed couplings or direct couplings or communication connections that are displayed or discussed may be indirect couplings or communication links that pass through some interfaces, devices, or units. They may be electrical or mechanical or may take another form.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, each functional unit in each of the embodiments of the present application may be integrated into a processing unit, or each unit may have an independent physical existence. Or two or more units may be integrated into one unit. The aforesaid integrated units can take the form of hardware, or they can take the form of hardware combined with software function units.

The units described above in which the software function units are integrated can be stored in a computer-readable storage medium. The aforesaid software function units are stored in a storage medium. This includes some instructions for causing a computer device (which could be a personal computer, a server, or a network device) or a processor to execute some of the steps in the methods described by the various embodiments of the present application. The storage medium described above encompasses: USB flash drive, mobile hard drive, read-only memory (ROM), random access memory (RAM), magnetic disk, optical disk, or various other media that can store program code.

The final point that should be explained is the following: The above embodiments only serve to explain the technical schemes of the present application and not to limit it. Although the present application was explained in detail with reference to the above-described embodiments, persons skilled in the art should understand that they may modify the technical schemes recorded in the various embodiments described above or provide equivalent substitutions for some of their technical features. Yet these modifications or substitutions do not cause the corresponding technical schemes to substantively depart from the spirit and scope of the technical schemes of the various embodiments of the present application.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
   obtaining, by a first terminal, an instruction to perform a voice communication with a second terminal;
   selecting a security level to be enforced during the voice communication, the security level being determined based at least in part on the instruction to perform the voice communication;
   determining at least one operation to be prevented during the voice communication, the at least one operation being determined based at least in part on the security level and a mapping of security levels to one or more operations to be prevented;
   in response to receiving the instruction to perform the voice communication with the second terminal, establishing, by the first terminal, a connection between the first terminal and the second terminal; and
   ensuring that voice communication between the first terminal and the second terminal is secure, the ensuring that the voice communication is secure comprising preventing the at least one operation during the voice communication.

2. The method of claim 1, wherein the instruction to perform the voice communication with the second terminal corresponds to an instruction to perform the voice communication in a secure communication mode.

3. The method of claim 2, wherein the instruction to perform the voice communication in the secure communication mode is obtained in connection with an instant messaging application running on at least one of the first terminal and the second terminal.

4. The method of claim 1, wherein the obtaining the instruction to perform the voice communication with the second terminal comprises receiving an input from a user of the first terminal, and the input includes the instruction to perform the voice communication with the second terminal.

5. The method of claim 1, wherein the establishing the connection with the second terminal comprises establishing the connection with the second terminal according to a secure communication mode associated with the instruction to perform the voice communication with the second terminal.

6. The method of claim 1, wherein the ensuring that the voice communication between the first terminal and the second terminal is secure comprises:
   enforcing one or more security policies with respect to an operation of one or more of the first terminal and the second terminal during the voice communication between the first terminal and the second terminal, the one or more security policies being determined based at least in part on the security level to enforce during the voice communication.

7. The method of claim 1, wherein the preventing the at least one operation during voice communication comprises:
   restricting one or more operations during the voice communication between the first terminal and the second terminal.

8. The method of claim 7, wherein the restricting the one or more operations comprises permitting only a subset of predefined operations to be performed during the voice communication between the first terminal and the second terminal.

9. The method of claim 7, wherein the restricting the one or more operations comprises displaying an interface on at least one of the first terminal and the second terminal, the interface being displayed during the voice communication between the first terminal and the second terminal, and the interface not including an element that can be selected to invoke the one or more operations that are restricted.

10. The method of claim 7, wherein the one or more operations that is restricted during the voice communication comprises an operation that is detrimental to a security of the voice communication between the first terminal and the second terminal.

11. The method of claim 7, wherein the one or more operations comprise one or more of: audio recording operations, speaker operations, peripheral device operations, communication record saving operations, operations to display identity information of a user and the second terminal, and screenshot operations.

12. The method of claim 1, wherein the obtaining the instruction to perform the voice communication with the second terminal comprises:
   receiving a start instruction from a user, the start instruction including an instruction to initiate a secure communication mode;
   providing a secure communication interface to a user, the secure communication interface being configured based at least in part on the start instruction; and
   obtaining the instruction to perform voice communication with the second terminal from a user via the secure communication interface.

13. The method of claim 1, wherein the ensuring that the voice communication between the first terminal and the second terminal is secure comprises one or more of:
   prohibiting, by one of the first terminal and the second terminal, invocation of one or more application-level functions that implement an operation that is detrimental to security of the voice communication, the implementation of the one or more application-level functions being prohibited in connection with the voice communication between the first terminal and the second terminal;
   screening and blocking, by one of the first terminal and the second terminal, the one or more application-level functions that implement the operation that is detrimental to security of the voice communication, the screening for one or more application-level functions being performed during the voice communication between the first terminal and the second terminal; and
   prohibiting, during voice communications between the first terminal and the second terminal, one or more system-level functions from being called, wherein the one or more system-level functions are associated with the operation that is detrimental to security of the voice communication.

14. The method of claim 1, wherein the ensuring that the voice communication between the first terminal and the second terminal is secure comprises:
   prohibiting, during voice communications between the first terminal and the second terminal, an operation from being performed by one or more of the first terminal and the second terminal, the operation being detrimental to security of the voice communication.

15. The method of claim 1, wherein one or more system-level functions correspond to functions provided by an operating system of the first terminal, the second terminal, or both.

16. The method of claim 1, wherein the ensuring that the voice communication between the first terminal and the second terminal is secure comprises preventing recording of audio associated with voice communication between the first terminal and the second terminal.

17. The method of claim 16, wherein recording of associated with voice communication between the first terminal and the second terminal is prohibited at one or more of the first terminal and the second terminal.

18. The method of claim 1, wherein the ensuring that the voice communication between the first terminal and the second terminal is secure comprises preventing use of a speakerphone mode during the voice communication between the first terminal and the second terminal.

19. The method of claim 18, wherein the speakerphone mode during the voice communication is prohibited at one or more of the first terminal and the second terminal during the voice communication between the first terminal and the second terminal.

20. The method of 1, wherein establishing the connection between the first terminal and the second terminal comprises providing to the second terminal an indication of a secure mode for the voice communication between the first terminal and the second terminal.

21. The method of claim 1, wherein:
the obtaining the instruction to perform a voice communication with the second terminal comprises:
obtaining, based at least on a user input, a selection of the level for the voice communication between the first terminal and the second terminal.

22. The method of claim 1, wherein the security level is selected based at least in part on a user input or a context of the first terminal.

23. A device, comprising:
one or more processors configured to:
obtain an instruction to perform a voice communication with a terminal;
select a security level to be enforced during the voice communication, the security level being determined based at least in part on the instruction to perform the voice communication;
determine at least one operation to be prevented during the voice communication, the at least one operation being determined based at least in part on the security level and a mapping of security levels to one or more operations to be prevented;
in response to receiving the instruction to perform the voice communication with the terminal, establish a connection between the device and the terminal; and
ensure that the voice communication between the device and the terminal is secure, wherein to ensure that the voice communication is secure comprises preventing the at least one operation during the voice communication; and
one or more memories coupled to the one or more processors, configured to provide the one or more processors with instructions.

24. A computer program product, the computer program product being embodied in a non-transitory computer readable storage medium and comprising computer instructions for:
obtaining, by a first terminal, an instruction to perform a voice communication with a second terminal;
selecting a security level to be enforced during the voice communication, the security level being determined based at least in part on the instruction to perform the voice communication;
determining at least one operation to be prevented during the voice communication, the at least one operation being determined based at least in part on the security level and a mapping of security levels to one or more operations to be prevented;
in response to receiving the instruction to perform the voice communication with the second terminal, establishing, by the first terminal, a connection between the first terminal and the second terminal; and
ensuring that the voice communication between the first terminal and the second terminal is secure, the ensuring that the voice communication is secure comprising preventing the at least one operation during the voice communication.

25. A method, comprising:
obtaining, by a first terminal, an instruction to perform a voice communication with a second terminal, the obtaining the instruction to perform a voice communication with the second terminal comprises:
obtaining a selection of a security level for the voice communication between the first terminal and the second terminal, the selection being input by a user to an interface provided on one or more of the first terminal and the second terminal;
in response to receiving the instruction to perform the voice communication with the second terminal, establishing, by the first terminal, a connection between the first terminal and the second terminal; and
ensuring that the voice communication between the first terminal and the second terminal is secure, the ensuring that the voice communication is secure comprising preventing at least one operation during the voice communication based at least in part on the selection of the security level.

26. The method of claim 25, further comprising:
in response to receiving the selection of the security level, determining the security level to be used in connection with the voice communication with the second terminal,
wherein the at least one operation that is prevented during the voice communication between the first terminal and the second terminal is determined based at least in part on the security level to be used in connection with the voice communication with the second terminal.

* * * * *

UNITED STATES PATENT AND TRADEMARK OFFICE
CERTIFICATE OF CORRECTION

PATENT NO. : 10,867,065 B2
APPLICATION NO. : 15/760172
DATED : December 15, 2020
INVENTOR(S) : Qing Ren and Hang Chen Page 1 of 1

It is certified that error appears in the above-identified patent and that said Letters Patent is hereby corrected as shown below:

On the Title Page

Item (73), assignee, country, insert --(KY)--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*